United States Patent [19]
Bednarek

[11] Patent Number: 5,323,889
[45] Date of Patent: Jun. 28, 1994

[54] PORTABLE DEVICE FOR HAND OPERATION OF MOTOR VEHICLES

[76] Inventor: Thomas Bednarek, 8402 Seawall Blvd., #7, Galveston, Tex. 77554

[21] Appl. No.: 37,330

[22] Filed: Mar. 26, 1993

[51] Int. Cl.⁵ .............................................. B60K 41/20
[52] U.S. Cl. ...................................... 477/209; 74/482; 81/488; 81/484; 254/DIG. 5
[58] Field of Search .................................. 74/481, 482; 254/DIG. 5; 81/488, 484; 192/1.52

[56] References Cited

U.S. PATENT DOCUMENTS

| | | | |
|---|---|---|---|
| 2,777,335 | 1/1957 | Engberg et al. | 74/481 |
| 4,424,723 | 1/1984 | Gockel | 74/482 |
| 4,788,879 | 12/1988 | Ulrich | 74/481 |
| 4,998,983 | 3/1991 | Ruprecht et al. | 74/482 |
| 5,119,688 | 6/1992 | Snyder | 74/482 |

Primary Examiner—Robert C. Watson
Attorney, Agent, or Firm—Harrison & Egbert

[57] ABSTRACT

An apparatus for the operation of the pedals of a motor vehicle including a first telescoping member, a second telescoping member, a brake handle in threaded connection to an end of the first telescoping member and having an opening allowing the second telescoping member to extend therethrough, a first pedal mount pivotally connected to an end of the first telescoping member opposite the brake handle, and a second pedal mount pivotally connected to an end of the second telescoping member opposite the brake handle. The brake handle extends outwardly transverse to a longitudinal axis of the first telescoping member. The second telescoping member has one end extending through the opening of the brake handle. The second telescoping member extends downwardly in generally parallel relationship to the first telescoping member. Each of the first and second telescoping members includes four interconnected sections in telescoping relationship. A lock collar is provided on each of the first and second telescoping members so as to secure the telescoping sections in fixed position.

17 Claims, 3 Drawing Sheets

SECTION 2-2

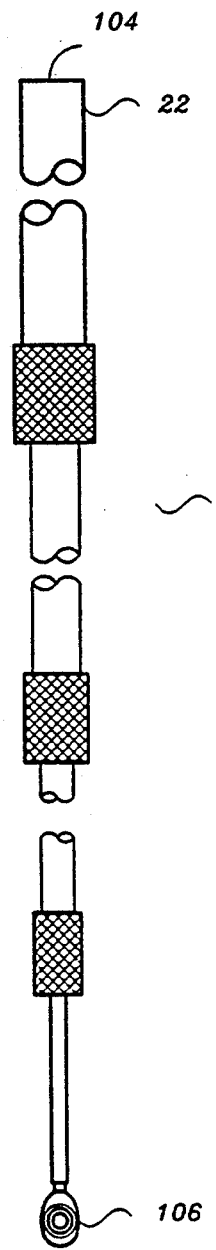
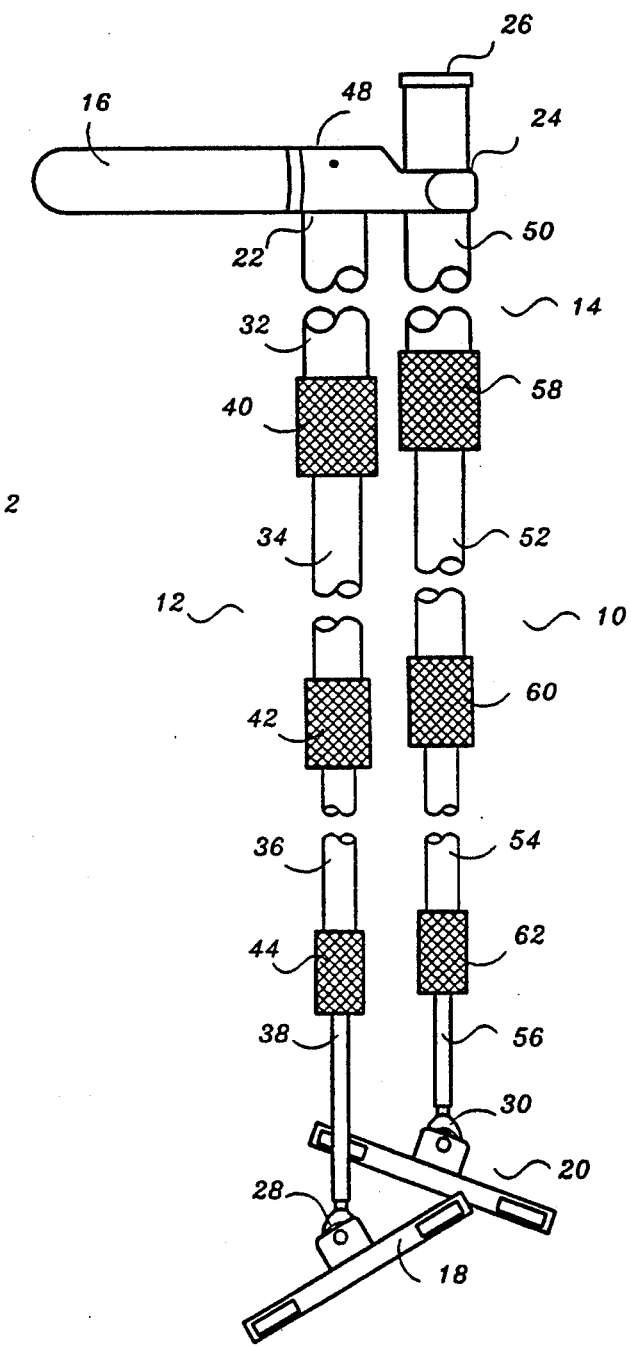
FIG. 7
FIG. 8

PORTABLE DEVICE FOR HAND OPERATION OF MOTOR VEHICLES

TECHNICAL FIELD

The present invention relates to the hand operation of motor vehicles. More particularly, the present invention relates to apparatus and methods for the manual operation of the pedals of a motor vehicle.

BACKGROUND ART

For many years, people who have limited use of their legs and feet have had difficulty during the operation of a motor vehicle. To reduce these difficulties, various devices have been proposed to allow operation of the brake and accelerator pedals with one hand. However, all of the devices known are bulky and complicated, and are unsuited for use by a traveler. Such devices are either permanently mounted to the car, or are too large to fit in a bag under the seat of an airplane, requiring that the device be checked as baggage. Other devices only operate on one pedal or simply function as a crude cruise control.

There is one device known that breaks down into multiple pieces that fit into a dedicated case for travel. This was disclosed in a Contact Technologies brochure for the CT-901 portable automobile hand controls. However, that device takes at least thirty minutes to assemble, and each piece is dedicated to a particular function. Therefore, the device is unsuitable for applications where lighting is poor or the weather is bad. For example, a device that takes thirty minutes to assemble in lighted conditions can be difficult to use and assemble in the dark, especially for someone who has limited mobility. Such a device is so cumbersome that it does not provide a practical means by which a person with limited mobility can travel alone, without checking baggage, rent a car at a destination, and to be able to use the car.

It is an object of the present invention to provide a device that will break down into a small number of basic pieces.

It is another object of the present invention to provide an apparatus that will fit into a briefcase or other container so as to be appropriate as a carry-on bag for air travel.

It is another object of the present invention to provide an apparatus that can be quickly and easily installed on the pedals of a motor vehicle, preferably in less than ten minutes.

It is still a further object of the present invention to provide an apparatus that is relatively easy to understand, easy to use, and relatively inexpensive.

These and other objects and advantages of the present invention will become apparent from a reading of the attached specification and appended claims.

SUMMARY OF THE INVENTION

The present invention is an apparatus for the operation of the pedals of a motor vehicle. This apparatus comprises a first telescoping member, a second telescoping member, a brake handle in threaded connection to an end of the first telescoping member and having an opening so as to allow the second telescoping member to extend therethrough, a first pedal mount pivotally connected to an end of the first telescoping member opposite the brake handle, and a second pedal mount pivotally connected to an end of the second telescoping member opposite the brake handle. The first telescoping member extends downwardly from the brake handle. The brake handle extends outwardly transverse to the longitudinal axis of the first telescoping member. The second telescoping member has one end which extends through the opening and is in slidable relationship therewith. The second telescoping member extends downwardly in generally parallel relationship to the first telescoping member. Each of the first and second pedal mounts includes means thereon for fastening to the pedal of a motor vehicle.

The first telescoping member includes at least four sections in telescoping interrelationship. These four sections have a means thereon, such as a lock collar, for fixing a position of one of the sections in relation to another of the sections. Similarly, the second telescoping member includes four telescoping sections and a means thereon for fixing the position of the sections in relation to each other. The first telescoping member has a section of greatest diameter affixed to the brake handle and has a section of least diameter connected to the first pedal mount. Similarly, the second telescoping member has a section of greatest diameter extending through the opening of the brake handle. The second telescoping member has a section of least diameter connected to the second pedal mount. The first and second telescoping members have an identical configuration.

The brake handle has a bore extending thereinto. This bore has a threaded connector formed therein. The first telescoping member extends into the bore so as to be in threaded connection with the threaded connector. The threaded connector is positioned adjacent to the opening. The brake handle extends distal this opening and has a gripping portion formed therein.

Each of the first and second pedal mounts has a generally rectangular configuration. Each of the first and second pedal mounts has a flat bottom surface. The first and second pedal mounts are of an identical configuration. The first pedal mount has a first bracket extending outwardly from a side of the first pedal mount opposite the flat bottom surface. The first telescoping member is pivotally connected to this first bracket. The first bracket is positioned centrally on the first pedal mount. The first pedal mount is rotatable about this pivotal connection. Similarly, the second pedal mount has a second bracket extending outwardly from a side of the second pedal mount opposite the flat bottom surface. The second telescoping member is pivotally and rotatably connected to this second bracket. The first and second pedal mounts have an identical configuration.

The opening of the brake handle has a diameter greater than the outer diameter of the second telescoping member. The second telescoping member is freely slidable therein. The brake handle is a rigid member and includes a gripping portion formed thereon. The first telescoping member has at least one lock collar affixed thereto. The lock collar is rotatable so as to fix a position of one of the sections relative to another of the sections. Specifically, the first telescoping member includes three lock collars that are rotatably secured at different locations along the first telescoping member. Similarly, the second telescoping member has a total of three lock collars secured in a similar manner.

BRIEF DESCRIPTION OF THE DRAWINGS

FIG. 7 is a top view of the pedal mount of the present invention.

FIG. 8 is an isolated side elevational view of the configuration of the first and second telescoping members of the present invention.

DETAILED DESCRIPTION OF THE INVENTION

Figure 1:
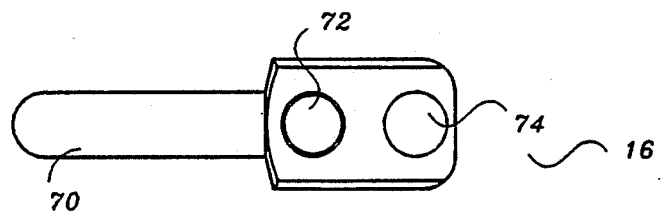
FIG. 1 is a side elevational view showing the apparatus in accordance with the preferred embodiment of the present invention.

Referring to FIG. 1 there is shown at 10 the apparatus in accordance with the preferred embodiment of the present invention. Specifically, the apparatus 10 is for the operation of the pedals of a motor vehicle. The apparatus 10 includes a first telescoping member 12, a second telescoping member 14, a brake handle 16, a first pedal mount 18, and a second pedal mount 20. Each of these components interact to provide the benefits of the apparatus 10 of the present invention.

Specifically, the brake handle 16 is in threaded connection with an end 22 of the first telescoping member 12. The first telescoping member 12 extends downwardly from the brake handle 16. As can be seen, the brake handle 16 extends outwardly transverse to the longitudinal axis of the first telescoping member 12. The brake handle 16 has an opening 74 formed therein (described in greater detail hereinafter). As can be seen, the second telescoping member 14 has an end 26 which extends through this opening. End 26 includes a cap threadedly received therein. This cap in end 26 has an identical configuration to the cap in the end of the first telescoping member 12. The second telescoping member 14 is in generally slidable relationship with this opening 74. The second telescoping member 14 extends downwardly in generally parallel relationship to the first telescoping member 12. Both the first telescoping member 12 and the second telescoping member 14 have an identical configuration. As can be seen, the first pedal mount 18 is pivotally mounted at 28 to the end of the first telescoping member 12. The second pedal mount 20 is pivotally connected at 30 to the end of the second telescoping member 14. Each of the first pedal mount 18 and the second pedal mount 20 includes suitable means thereon for fastening to the pedals of a motor vehicle.

As can be seen in FIG. 1, the first telescoping member 12 has a first section 32, a second section 34, a third section 36, and a fourth section 38. A first lock collar 40 is rotatably connected to the first section 32 so as to extend around the second section 34 for the purpose of fixing a position of the second section 34 in relation to the first section 32. Similarly, a second lock collar 42 is positioned on the second section 34 and over an end of the third section 36. The lock collar 42 is rotatable so as to fix a position of the third section 36 in relation to the second section 34. A third lock collar 44 is rotatably connected to an end of the third section 36 so as to extend over the fourth section 38. The third lock collar 44 is rotatable so as to fix a position of the fourth section 38 in relation to the third section 36. As can be seen, the first pedal mount 18 is pivotally connected to the end 28 at the end of the fourth section 38. The first section 32 is affixed to the brake handle 16 at 28. The first section 32 is the section of greatest diameter. The first telescoping member 12 generally narrows through its various sections 32, 34, 36 and 38, such that the narrow diameter section 38 is connected to the pedal mount 18. This configuration of the telescoping sections provides the necessary strength and compactability for the purposes of the present invention. Typically, the first pedal mount 18 will be affixed to the brake pedal of a motor vehicle.

The second telescoping member 14 is made up of a first section 50, a second section 52, a third section 54, and a fourth section 56. The first section 50 is of greatest diameter. The end 26 of the first section 50 extends through the opening 74 on the brake handle 16. The end 26 essentially serves as a gas knob for the activation of the accelerator pedal of a motor vehicle. A threaded member is received in the end 26 of the second telescoping member 14. A first lock collar 58 is rotatably connected to an end of the first section 50 and extends over a portion of the second section 52. The first lock collar 58 is suitable for affixing a position of the first section 50 relative to the second section 52. Similarly, a second lock collar 60 is rotatably connected to the second section 52 and extends over the third section 54 so as to allow for the fixing of the third section 54 relative to the second section 52. A third lock collar 62 is rotatably connected to the third section 54 and extends over the fourth section 56 so as to fix a position of the fourth section 56 relative to the third section 54. The end 30 of the fourth section 56 is pivotally connected to the second pedal mount 20. The second pedal mount 20 includes means thereon for fixing the pedal 20 to the accelerator pedal of an automobile.

In use, the end 26 of the second telescoping member 14 can be pressed downwardly so as to provide acceleration to the motor vehicle. A downward pressing, with the thumb, of the end 26 of the second telescoping member 14 will cause the accelerator pedal to become depressed. When it is desired to operate the brake pedal, the brake handle 16 is pushed downwardly. This will exert a force on the first pedal mount 18 while, at the same time, cause a raising (or removal of pressure) of the second pedal mount 20 from the accelerator pedal.

Figure 2:
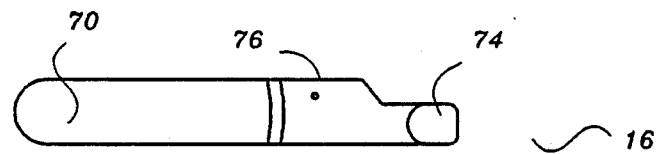
FIG. 2 is a bottom view of the brake handle in accordance with the present invention.

FIG. 2 is an isolated view of the bottom side of the brake handle 16. It can be seen that the brake handle 16 has a gripping portion 70 extending outwardly from the opening 72 and the opening 74. The first opening 72 is suitable for the receipt of the end 22 of the first telescoping member 12. The second opening 74 is suitable for the receipt of the end 26 of the second telescoping member 14. The gripping portion 70 is adopted for manipulation by a human hand. The opening 72 includes a threaded connector (to be described hereinafter) for the fixed receipt of the end of the first telescoping member 12.

Figure 3:
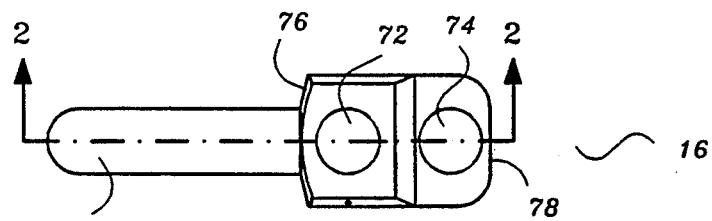
FIG. 3 is a side elevation view of the brake handle of the present invention.

FIG. 3 is a side view of the brake handle 16. As can be seen, the brake handle 16 narrows at the area of the opening 74. A thickened portion includes the area of the opening 72 at section 76. The gripping portion 70 extends outwardly from the section 76 so as to provide an area for manipulation by a human hand.

Figure 4:
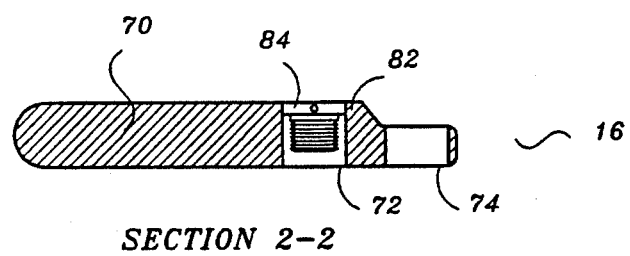
FIG. 4 is a top view of the brake handle in accordance with the present invention.

FIG. 4 shows a top view of the brake handle 16 of the present invention. As can be seen, the gripping portion 70 has a relatively narrow diameter. The gripping portion 70 extends to the body portion 76. Body portion 76 includes a cap 73 which is affixed within the opening 72. Cap 73 is affixed within opening 72 using an appropriate set screw. The first telescoping member 12 will be inserted into the threaded portion of cap 73 on the interior of opening 72. Similarly, it can be seen that the second opening 74 is adjacent to the end 78 of the brake handle 16. In general, the opening 72 is adjacent to the opening 74 on a side of the midpoint of the brake handle 16 opposite the gripping portion 70.

Figures 5, 6:
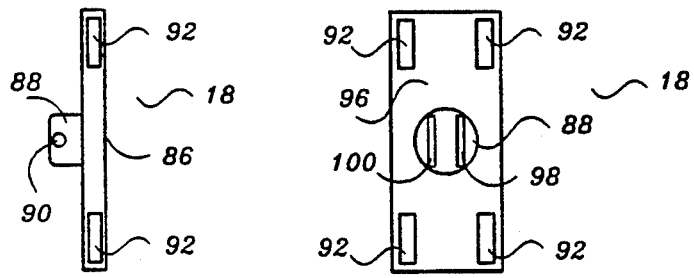
FIG. 5 is a cross-sectional view taken along lines A—A of FIG. 4 of the brake handle of the present invention.
FIG. 6 is an isolated side elevational view of the pedal mount of the present invention.

FIG. 5 shows a cross-sectional view of the brake handle 16 of the present invention. As can be seen, the first opening 72 includes a threaded connector 82 positioned therein. Specifically, the threaded connector 82 has an external thread. The cap 73 is affixed in its position within the opening by fastening a set screw 83. The threaded portion of connector 82 extends downwardly from cap 73 in the interior of opening 72. The opening 72 has a diameter matching the diameter at 22 of the first telescoping member 12. The first telescoping member 12 has an internal thread formed at the end 22 so that it can be easily threaded onto the external threads of the threaded connector 82. The second opening 74 extends through the thickness of the brake handle 16. The configuration of this opening 74 allows the second telescoping member 14 to extend therethrough. The gripping portion 70 is a solid rigid portion.

FIG. 6 is a side view of the pedal mount 18. As can be seen, the pedal mount 18 has a flat surface 86 on one side and a bracket 88 on an opposite side of the flat surface 86. The bracket 88 includes a pin hole 90 suitable for the pivotal receipt of the end of the first telescoping member. Openings 92 are provided on the pedal mount 18 so as to allow straps, or other fittings, to extend therethrough. These straps can be used so as to secure the pedal mount 18 to the brake or gas pedal of a motor vehicle.

FIG. 7 is a view of the top side of the pedal mount 18. As can be seen, the pedal mount 18 has a generally rectangular configuration. A plurality of openings 92 are formed so as to extend through the pedal mount 18. These openings 92 are suitable for the receipt of belts, loops, or other items that can be used to secure the pedal mounts to the pedals. As can be seen, the bracket 88 is affixed centrally and allowed to turn freely. The bracket 88 includes a first member 98 and a second member 100. Each of these members 98 and 100 includes the pin hole 90. The configuration of these members 98 and 100 is suitable for connecting to the end of the telescoping members. A pin 30 is used to connect the pedal mounts to the telescoping members.

It should be noted that the second pedal mount 20 has a configuration identical to that of the illustrated first pedal mount 18. As such, the identical configuration of these pedal mounts (and of the telescoping members) assures easy installation without confusion during night time or in darkened conditions.

FIG. 8 is an isolated view of the telescoping member 12. As illustrated, the first telescoping member 12 has an identical configuration to that of the second telescoping member 14. Most importantly, the end 22 of the telescoping member 12 has an internal threaded area 104. The internal threaded area 104 can be used so as to establish a quick threaded connection with the threaded connector on the brake handle 16 and/or the gas knob 26. It is also important to see, at the other end of the first telescoping member 12, that a connector hole 106 is provided. This connector hole 106 is designed so as to fit between the members 98 and 100 of bracket 88 and also to receive a pin, or other connector, extending therethrough. As such, the connector hole 106 facilitates the ability to connect the pedal mounts to the telescoping member.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. An apparatus for operation of pedals of a motor vehicle comprising:
   a first telescoping member;
   a second telescoping member;
   a brake handle in threaded connection to an end of said first telescoping member, said first telescoping member extending downwardly from said brake handle, said brake handle extending outwardly transverse to a longitudinal axis of said first telescoping member, said brake handle having an opening formed therein, said second telescoping member having one end extending in slidable relationship through said opening, said second telescoping member extending downwardly in generally parallel relationship to said first telescoping member;
   a first pedal mount pivotally and rotatably connected to an end of said first telescoping member opposite said brake handle; and
   a second pedal mount pivotally and rotatably connected to an end of said second telescoping member opposite said brake handle, each of said first and second pedal mounts having means thereon for fastening to the pedals of a motor vehicle, said first pedal mount and said first telescoping member having an identical configuration to said second pedal mount and said second telescoping member.

2. The apparatus of claim 1, said first telescoping member comprising at least four sections in telescoping relationship, said four sections having means thereon for fixing a position of one of said sections in relation to another of said sections.

3. The apparatus of claim 1, said second telescoping member comprising at least four sections in telescoping relationship, said four sections having means thereon for fixing a position of one of said sections in relation to another of said sections.

4. The apparatus of claim 3, said second telescoping member having a section of greatest diameter extending through said opening of said brake handle, said second telescoping member having a section of least diameter connected to said second pedal mount.

5. The apparatus of claim 1, said brake handle having a bore extending thereinto, said bore having a threaded connector affixed therein, said first telescoping member extending into said bore and in threaded connection with said threaded connector.

6. The apparatus of claim 5, said threaded connector positioned adjacent to said opening on said brake handle, said brake handle extending distal said opening.

7. The apparatus of claim 1, said first and second pedal mounts having a generally rectangular configuration, said first and second pedal mounts having a flat bottom surface.

8. The apparatus of claim 7, said first pedal mount having a first bracket extending outwardly from a side of said first pedal mount opposite said flat bottom surface, said first telescoping member pivotally connected to said first bracket.

9. The apparatus of claim 8, said first bracket positioned centrally on said side, said first pedal mount rotatable about the pivotal connection with said first telescoping member, said first bracket rotatably connected to said first pedal mount.

10. The apparatus of claim 7, said second pedal mount having a second bracket extending outwardly from a side of said second pedal mount opposite said flat bottom surface, said second telescoping member pivotally connected to said second bracket.

11. The apparatus of claim 10, said second bracket positioned centrally on said side, said second pedal mount rotatable about the pivotal connection with said second telescoping member.

12. The apparatus of claim 1, said opening on said brake handle having a diameter greater than a diameter of said telescoping member, said second telescoping member freely slidable therein and therethrough.

13. The apparatus of claim 1, said brake handle being a rigid member, said brake handle having a gripping portion formed thereon.

14. The apparatus of claim 1, said first telescoping member having at least one lock collar affixed thereto, said first telescoping member having at least two interconnected sections, said lock collar rotatable so as to fix a position of one of said sections relative to another of said sections.

15. The apparatus of claim 14, said first telescoping member having three lock collars rotatably secured to different locations along said first telescoping member.

16. The apparatus of claim 1, said second telescoping member having at least one lock collar affixed thereto, said second telescoping member having at least two interconnected sections, said lock collar rotatable so as to fix a position of one of said sections relative to another of said sections.

17. The apparatus of claim 16, said second telescoping member having three lock collars rotatably secured to different locations along said second telescoping member.

* * * * *